US007373824B2

(12) United States Patent
Krieger et al.

(10) Patent No.: US 7,373,824 B2
(45) Date of Patent: May 20, 2008

(54) AUTOMOTIVE AUTOMATIC TRANSMISSION NOISE ATTENUATORS

(75) Inventors: Clifford Krieger, Dryden, MI (US); Steve Wozniak, Walled Lake, MI (US); Jim Beatty, Marysville, MI (US)

(73) Assignee: Coupled Products LLC, Rochester Hills, MI (US)

(*) Notice: Subject to any disclaimer, the term of this patent is extended or adjusted under 35 U.S.C. 154(b) by 573 days.

(21) Appl. No.: 11/119,030

(22) Filed: Apr. 29, 2005

(65) Prior Publication Data

US 2006/0243335 A1 Nov. 2, 2006

(51) Int. Cl.
*F16L 55/04* (2006.01)

(52) U.S. Cl. .............................. 73/700; 73/714; 138/30

(58) Field of Classification Search .................. 73/701, 73/714; 138/30
See application file for complete search history.

(56) References Cited

U.S. PATENT DOCUMENTS

| | | | | |
|---|---|---|---|---|
| 3,323,305 A | | 6/1967 | Klees | |
| 3,902,567 A | | 9/1975 | Pekar, Jr. | |
| 4,473,043 A | | 9/1984 | Furukawa et al. | |
| 4,881,712 A | * | 11/1989 | Lun | 267/140.13 |
| 4,942,947 A | * | 7/1990 | Shtarkman | 188/267.2 |
| 5,273,261 A | | 12/1993 | Hamberg et al. | |
| 5,295,414 A | | 3/1994 | Nakamura et al. | |
| 5,385,018 A | | 1/1995 | Kohno et al. | |
| 5,890,982 A | | 4/1999 | Meyerle | |
| 6,123,108 A | | 9/2000 | Chen et al. | |
| 6,155,378 A | | 12/2000 | Qatu et al. | |
| 6,269,841 B1 | | 8/2001 | Chen et al. | |
| 6,568,500 B1 | | 5/2003 | Krieger et al. | |

* cited by examiner

*Primary Examiner*—Andre J. Allen
(74) *Attorney, Agent, or Firm*—Dykema Gossett PLLC

(57) ABSTRACT

An apparatus for attenuation of fluid pressure pulses in a hydraulic system of an automatic transmission is provided. In one embodiment of the invention, a wave tuner is disposed within a fluid conduit between the transmission and a transmission fluid cooler. In another embodiment of the invention, a stand pipe is teed into the conduit with an open end of the stand pipe communicating with the conduit and an opposite closed end reflecting pressure pulses.

20 Claims, 3 Drawing Sheets

Transmission
Pump
Transmission Oil Cooler
22
26
20
28
36
34
32
38
24
30

40
34
36
32
38

48
46
42
44
32
50

54
52
56

104
116
114
102
110
106

104
114
116
102
72
76
78

136
144
130
132
140
134
142
138
80'
81
72'

128
126
120
124
122
118

AUTOMOTIVE AUTOMATIC TRANSMISSION NOISE ATTENUATORS

BACKGROUND OF THE INVENTION

1. Field of the Invention

The present invention relates to attenuation of fluid pressure pulses in hydraulic systems, and more particularly, to an apparatus for attenuation of fluid pressure pulses in a hydraulic system of an automatic transmission.

2. Discussion of Related Art

Many conventional automotive vehicles include an automatic transmission. Vehicle transmissions enable relatively wide variation in output torque as applied to the vehicle wheels while allowing the vehicle engine to operate within a relatively narrow range of engine speeds. Engine torque and speed are converted in the transmission in accordance with the tractive-power demand of the vehicle. A conventional transmission includes a hydromatic torque convertor to transfer engine torque from the engine crankshaft to a rotatable input member of the transmission through fluid-flow forces. The transmission then uses hydraulic pressure to automatically select the proper gears for the torque and speed requirements of the vehicle. A hydraulic pump is used to maintain proper hydraulic pressure within the transmission and to lubricate components within the transmission. The pump is typically contained within the transmission housing. The transmission fluid is cooled by routing the transmission fluid outside of the transmission housing to a transmission oil cooler that is typically mounted on the vehicle radiator. The transmission fluid is then returned to the transmission where it is redistributed by the pump.

The fluid pump in the transmission produces fluid pressure pulses during operation. These fluid pressure pulses create noise and energy surges at the pumping frequencies that relate to the pump speed. In particular, these pressure pulses produce audible noise, as well as structural vibration, that are transmitted into the vehicle structure. Developing a structure that is not sensitive to these pressure pulses may be time-consuming and costly and greatly affect design flexibility.

The inventors herein have recognized a need for an apparatus for attenuation of fluid pressure pulses in a hydraulic system of an automatic transmission that will minimize and/or eliminate the above-identified deficiencies.

SUMMARY OF THE INVENTION

The present invention provides an apparatus for attenuation of fluid pressure pulses in a hydraulic system of an automatic transmission.

The apparatus includes a conduit disposed between a transmission and a transmission fluid cooler, the conduit transmitting fluid between the transmission and the transmission fluid cooler. In one embodiment of the invention, the apparatus further includes a wave tuner disposed within the conduit. In another embodiment of the invention, the apparatus includes a stand pipe having an open end in fluid communication with the conduit and a closed end, the stand pipe sized to attenuate the fluid pressure pulses.

An apparatus for attenuation of fluid pressure pulses in a hydraulic system of an automatic transmission in accordance with the present invention is advantageous. By attenuating the fluid pressure pulses, audible noise and structural vibration from the pulses is reduced. As a result, driver comfort is improved and design flexibility for the vehicle structure including the transmission oil cooler is preserved.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figures 1, 2, 3, 4:
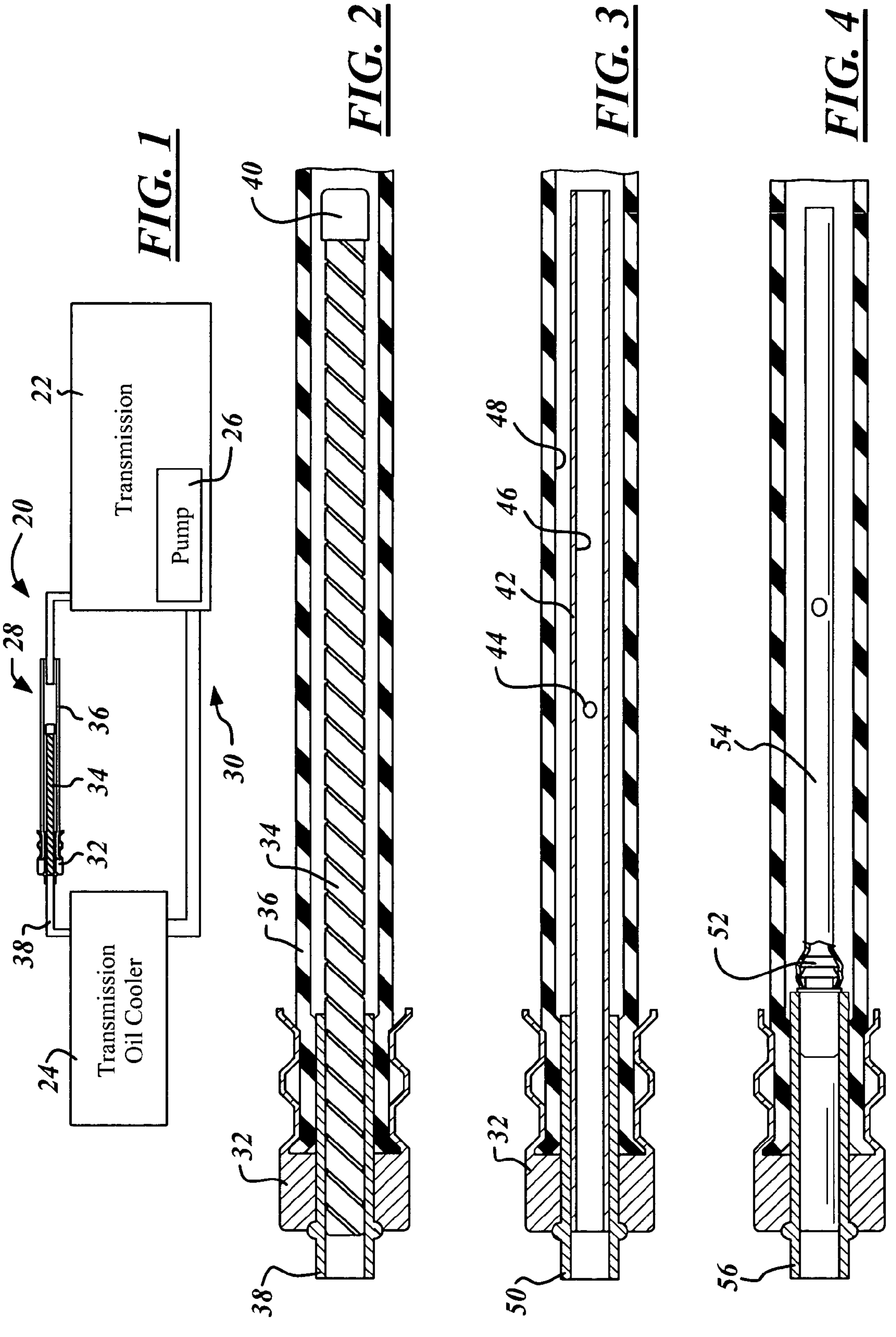
FIG. 1 is a schematic diagram of a hydraulic system of an automatic transmission incorporating an apparatus for attenuation of fluid pressure pulses in the system in accordance with one embodiment of the present invention.
FIG. 2 is a cross-sectional view of the apparatus of FIG. 1.
FIGS. 3-4 are cross-sectional views of apparatii for attenuation of fluid pressure pulses in a hydraulic system of an automatic transmission in accordance with additional embodiments of the present invention.

Referring now to the drawings wherein like reference numerals are used to identify identical components in the various views, FIG. 1 illustrates a portion of a hydraulic system 20 for an automatic transmission 22. System 20 is provided to distribute transmission fluid within transmission 22 and to transmit fluid between transmission 22 and a transmission fluid cooler 24. In addition to transmission 22 and cooler 24, system 20 includes a pump 26, fluid conduits 28, 30, coupling shells 32 and, in accordance with one embodiment of the present invention, a wave tuner 34 for attenuation of fluid pressure pulses in system 20.

Transmission 22 is provided to enable a vehicle engine to operate within a relatively narrow range of engine speeds while delivering a wide range of output torque to the vehicle wheels. Transmission 22 is conventional in the art and may comprise an automatic transmission.

Transmission fluid cooler 24 is provided to transfer heat away from the transmission fluid to maintain the properties of the transmission fluid. Cooler 24 is conventional in the art and may comprise a conventional air/liquid heat exchanger.

Pump 26 is provided to maintain proper hydraulic pressure within transmission 22 and to lubricate components within transmission 22. Pump 26 is conventional in the art. Pump 26 may be disposed within the housing of transmission 22, drawing transmission fluid from a sump formed in the housing. The operation of pump 26 results in pressure pulses that can lead to undue acoustic noise and structural vibration (particularly within cooler 24).

Conduits 28, 30 transmit transmission fluid between transmission 12 and fluid cooler 14. Conduits 28, 30 may include sections of hose 36 and/or metal tubing 38 as is known in the art. Hose 36 may be made from rubber or other elastically deformable materials. Tubing 38 may be made from metals and metal alloys such as steel or aluminum.

Coupling shells 32 are provided to couple sections of hose 36 and metal tubing 38. Shells 32 are conventional in the art and may be made from a relatively thin, pliable metal. Shells 32 are disposed about a portion of hose 36 that in turn surrounds one end of a metal tube 38. Shell 32 is then compressed radially inwardly (or crimped) to form a joint between hose 36 and tube 38.

Wave tuner 34 is provided to attenuate fluid pressure pulses in system 10. Referring to FIG. 2, tuner 34 may comprise a flexible wound metal cable. The cable may include one or more continuous spirally wrapped metal wires as is known in the art. Upon winding, the wires form a continuous hollow tube having a relatively constant wall thickness. An end cap 40 may be disposed at one end to prevent the wires from unraveling. The other end of tuner 34 may be coupled to one end of a metal tube 38. Metal tube 38 may comprise an intermediate section of metal tubing for one of conduits 28, 30. Alternatively, tube 38 may comprise the inlet or outlet end of a fluid coupling connecting the conduits 28, 30 to transmission 22 or cooler 24. One end of tuner 34 extends into tube 38 and is secured therein upon the crimping of shell 32 which exerts a radial force on tube 38 and deforms tube 38. In the illustrated embodiment, wave tuner 34 extends in a direction opposite to the direction of fluid flow. Wave tuner 34 can also extend in the same direction as the fluid flow, however.

Referring now to FIG. 3, in accordance with another embodiment of the present invention, an apparatus for attenuation of fluid pressure pulses in system 10 may include a wave tuner 42. Wave tuner 42 is tubular and made from a polymeric material, such as polytetrafluoroethylene or polymer thick film (PTF). Wave tuner 42 may include one or more bleed holes 44 that establish fluid communication between the outer and inner concentric fluid passages 46, 48 defined by wave tuner 42. Bleed holes 44 provide a means for controlling the range of frequency attenuation. Larger bleed holes enable attenuation of a broader range of pressure pulse frequencies, but with less attenuation. Smaller bleed holes enable increase attenuation at specific frequencies, but attenuation of a smaller range of pressure pulse frequencies. One end of tuner 42 may be coupled to one end of a metal tube 50. Metal tube 50 may comprise an intermediate section of metal tubing for one of conduits 28, 30. Alternatively, tube 50 may comprise the inlet or outlet end of a fluid coupling connecting the conduits 28, 30 to transmission 22 or cooler 24. In the illustrated embodiment, wave tuner 42 again extends in a direction opposite to the direction of fluid flow. Wave tuner 42 can also extend in the same direction as the fluid flow, however.

Wave tuners 34, 36 are designed to cancel pressure pulses within system 10 by reflecting pressure pulses with a one hundred and eighty (180) degree phase shift to cancel the succeeding pressure pulse. The length of wave tuners 34, 46 varies depending on the properties of the conduit in which the tuners 34, 46 will be disposed. The length may be calculated in accordance with the following equation:

$$\frac{1}{4}\lambda = \frac{C_0}{f}$$

where $C_0$ is the speed of sound of fluid in an elastic hose and f is the frequency to be attenuated. $C_0$ may be calculated as follows:

$$C_0 = \frac{V_0}{\sqrt{1 + \frac{K}{E}\frac{D}{t}}}$$

where $V_0$ is the speed of sound in a fluid with infinite stiffness boundary, K is the bulk modulus of elasticity of the hose, E is Young's modulus, D is the inside diameter of the hose, and t is the wall thickness of the hose.

Figures 5, 6A, 7, 8, 9, 10:
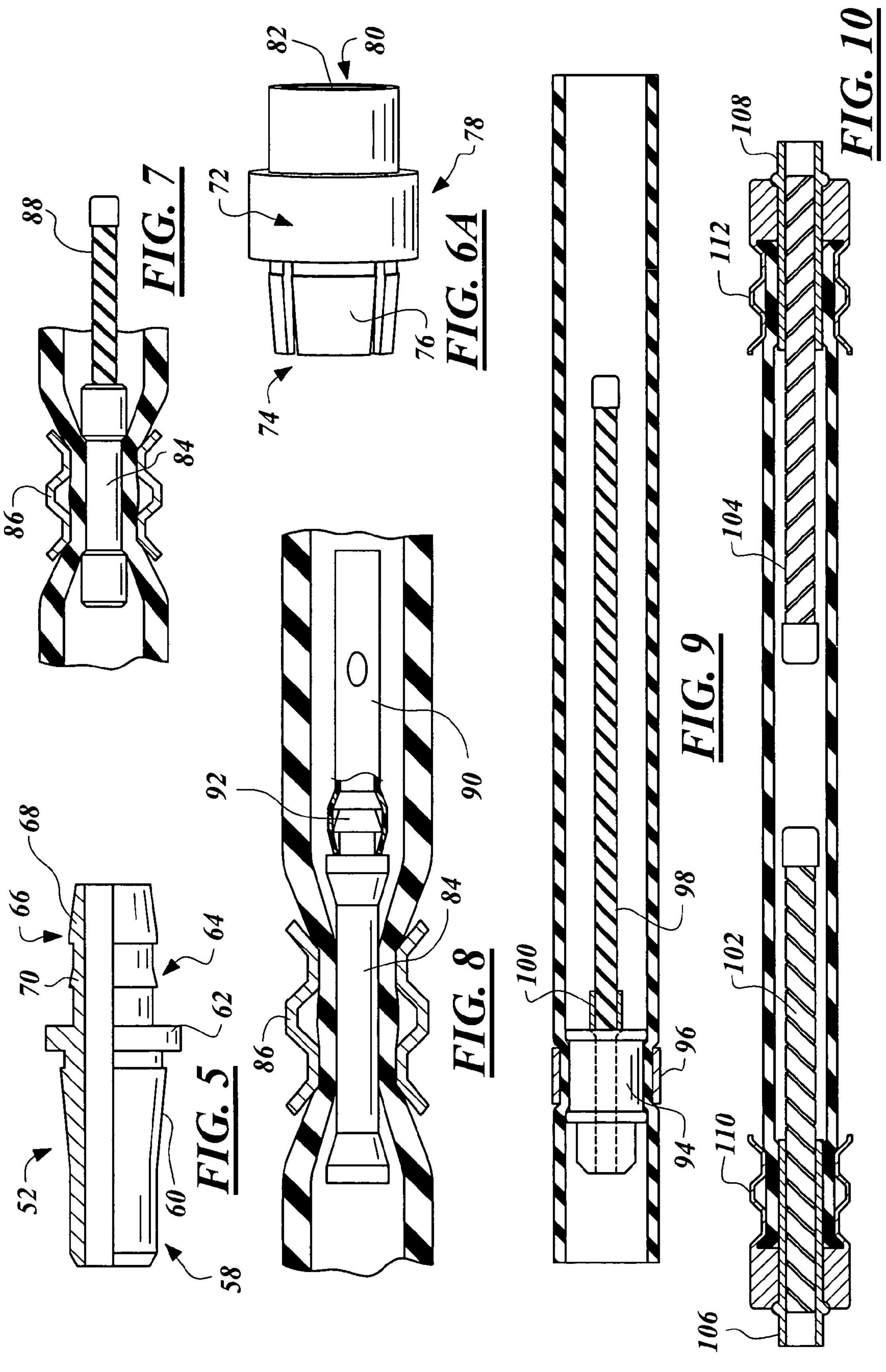
FIG. 5 is a cross-sectional view of a coupling used in the apparatus of FIG. 4 and in other embodiment of the present invention.
FIGS. 6A-C are perspective, end and side views of additional couplings configured for use in the apparatus of FIG. 4 and in other embodiments of the present invention.
FIGS. 7-14 are cross-sectional views of apparatii for attenuation of fluid pressure pulses in a hydraulic system of an automatic transmission in accordance with additional embodiments of the present invention.

Referring now to FIG. 4, in accordance with another embodiment of the present invention, an apparatus for attenuation of fluid pressure pulses in system 10 may include a coupling 52 and a wave tuner 54. Wave tuner 54 is substantially similar to wave tuner 42 discussed hereinabove. Coupling 52 is provided to support wave tuner 54 and is disposed within tube 56. Referring to FIG. 5, coupling 52 may include a first end portion 58 that is tubular and is sized for receipt within tube 56. End portion 58 may include engagement features, such as an outer surface 60 with an expanding diameter, to facilitate retention of coupling 52 within tube 56 after installation. Coupling 52 is also retained within tube 56 by crimping a coupling shell disposed about the end of tube 56 to exert a radial force on tube 56 and deform tube 56. Coupling 52 may include a center portion 62 having a diameter greater than the internal diameter of tube 56 to limit insertion of coupling 52 and otherwise facilitate proper placement of coupling 52. Coupling 52 may further include a second end portion 64 having an end form 66. End form 66 is configured such that one end of wave tuner 54 may be urged over end portion 64 and end form 66 and be retained thereon. In the illustrated embodiment, end form 66 comprises a plurality of barbs 68, 70 formed on the radially outer surface of end portion 64. Barb 68, 70 may increase in diameter approaching center portion 62. It should be understood that a variety of end forms 66 could be used without departing from the spirit of the present invention.

Figures 6B, 6C, 11, 12, 13, 14:
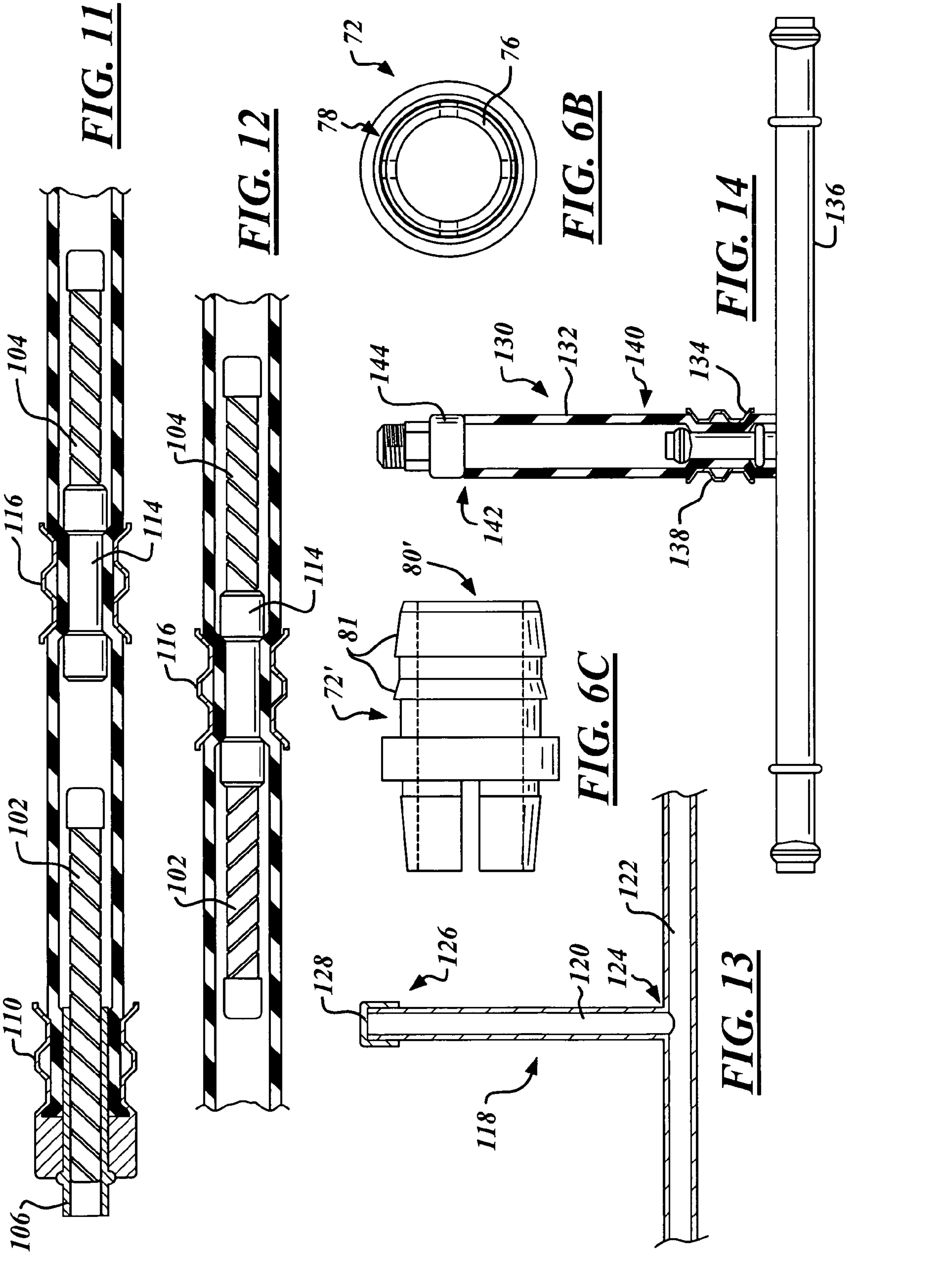

Referring now to FIGS. 6A-B, another example of a coupling 72 is illustrated. Coupling 72 is again provided to support a wave tuner such as wave tuner 34 or 42 within a tube portion of conduits 28, 30. Coupling 72 may be made from metal or metal alloys such as aluminum or steel, is tubular, and may include a first end portion 74 comprising a plurality of elastically deformable fingers 76. Fingers 76 may be compressed radially inwardly and inserted within the metal tube after which fingers 76 spring radially outwardly to engage the inner surface of the tube and facilitate retention of coupling 72 within the tube. Fingers 76 may be equally sized and spaced from one another with each finger 76 diametrically opposite another finger 76. The use of fingers 76 is advantageous because coupling 72 may be securely held within the metal tube without staking of the coupling to the tube. Coupling 72 may include a center portion 78 having a diameter greater than the internal diameter of the tube to limit insertion of coupling 72 and otherwise facilitate proper placement of coupling 72. Finally, coupling 72 may include a second end portion 80 configured for mounting of a wave tuner 34 or 42. In the illustrated embodiment, end portion 80 is tubular, defining a cylindrical bore 82 configured to receive one end of waver tuner 34 or 42. It should be understood, however, that end portion 80 could assume a variety of forms capable of engaging and retaining wave tuners 34, 42. Referring to FIG.

6C, for example, a coupling 72' could have an end portion 80' having an end form 81 such as a plurality of barbs to retain tuner 42.

Referring not to FIG. 7, in another embodiment of the invention an apparatus for attenuation of fluid pressure pulses may include a restrictor 84, a coupling shell 86, and a wave tuner 88. Restrictor 84 assists in attenuation of pressure pulses, forming a wave reflecting barrier and dividing the fluid passage of conduits 28, 30 into subpassages. Restrictor 84 may comprise a "dog bone" metal sleeve as shown in the illustrated embodiment. It should be understood, however, that restrictor 84 may assume other forms conventional in the art including having one or more axially extending passages to throttle the fluid. Coupling shell 86 is provided to secure restrictor 84 within conduits 28, 30. Shell 86 is conventional in the art and may be made from a relatively thin, pliable metal. Shell 86 is disposed about a portion of hose or tubing radially aligned with restrictor 84. Shell 86 is then compressed radially inwardly (or crimped) to form a joint between the restrictor 84 and the hose or tubing. In the illustrated embodiment wave tuner 88 is similar to wave tuner 34 described hereinabove and is received within one end of restrictor 84. It should be understood, however, that waver tuner 88 may be similar to wave tuner 42 described hereinabove. Further, and with reference to FIG. 8, a wave tuner 90 may be supported by restrictor 84 and indirectly attached to restrictor 84 using a coupling 92 similar to the couplings 52, 72 described hereinabove or similar couplings. Although the wave tuner 90 illustrated in FIG. 8 is similar to wave tuner 42 described hereinabove, it should be understood that wave tuner 90 may alternatively assume the form wave tuner 34 described hereinabove.

Referring now to FIG. 9, in accordance with another embodiment of the invention an apparatus for attenuation of fluid pressure pulses may include an insert 94, a clamp 96 and a wave tuner 98. Insert 94 provides a means of mounting tuner 98 intermediate the ends of a section of conduit 28, 30. Insert 94 may also act as a restrictor similar to restrictor 84 described hereinabove. Clamp 96 is provided to secure insert 94 within conduits 28, 30 and may also be used in place of coupling shells 32 in other embodiments of the invention. Clamp 96 is conventional in the art and may comprise a reusable clamp distributed under the trademark "OETIKER" by Oetiker, Inc. of Marlette, Mich. Insert 94 may define a cylindrical bore in one end portion 100 sized to receive one end of wave tuner 98. Although wave tuner 98 is similar to wave tuner 34 described hereinabove in the illustrated embodiment, it should be understood that wave tuner 98 may alternatively assume the form of wave tuner 42. Further, it should be understood that a coupling, such as couplings 52, 72 described hereinabove, could be inserted within end portion 100 and used to support wave tuner 98.

Referring now to FIGS. 10-12, in accordance with additional embodiments of the invention an apparatus for attenuation of fluid pressure pulses may include multiple wave tuners 102, 104 disposed in series within conduits 28, 30. Referring to FIGS. 10 and 12, tuners 102, 104 could be arranged to face in opposing directions. Alternatively, and with reference to FIG. 11, tuners 102, 104 could be arranged to face in the same direction (either in the same direction of fluid flow or against the direction of fluid flow). Referring to FIG. 10, tuners 102, 104 may each be coupled to metal tubes 106, 108, using coupling shells 110, 112 as described hereinabove with reference to FIG. 2. Alternatively, and with reference to FIG. 12, tuners 102, 104 may each be coupled to opposite ends of a restrictor 114 and held in place using a coupling shell 116 as described hereinabove with reference to FIG. 7. As yet another alterative, and with reference to FIG. 11, one tuner 102 may be coupled to a metal tube 106 using a coupling shell 110 while another tuner 104 is coupled to either end of a restrictor 114 and held in place using a coupling shell 116. It should again be understood that, although wave tuners 102, 104 are illustrated in a manners similar to wave tuner 34 described hereinabove, either or both of wave tuners 102, 104 may alternatively take the form wave tuner 42 described hereinabove. Further, either of wave tuners 102, 104 may be supported within metal tubes 106, 108 or restrictor 114 using a coupling such as coupling 52 or 72 described hereinabove.

Referring now to FIG. 13, in another embodiment of the invention an apparatus for attenuation of fluid pressure pulses may include a stand pipe 118. Stand pipe 118 includes comprises a closed branch of conduit 28, 30. Stand pipe 118 may comprise a metal tube 120 integrally formed with, or joined to, a section 122 of conduit 28 or 30. Stand pipe 118 has an open end 124 in fluid communication with section 122 of conduit 28 or 30 and a closed end 126 opposite the open end. The closed end 126 may be closed by a cap 128. Alternatively, the closed end may include a valve (not shown) to bleed air from the pipe 118 after installation.

Referring now to FIG. 14, an apparatus for attenuation of fluid pressure pulses may include a stand pipe 130 that is formed from a length of hose 132. Hose 132 may be coupled to a nipple 134 branched from a section 136 of conduit 28, 30 using a coupling shell 138 similar to shell 32 described hereinabove. Stand pipe 130 again has an open end 140 in fluid communication with section 136 of conduit 28 or 30 and a closed end 142 opposite the open end 140. The closed end 142 may be closed by a valve 144 to bleed air from pipe 130 during installation or by a cap (not shown).

The length of stand pipes 118, 130 may be calculated in a similar manner to the length of wave tuners 34, 42. In the embodiments illustrated in FIGS. 13-14, sections 122, 136 of conduits 28 or 30 comprise metal tubing. It should be understood, however, that stand pipes 118, 130 could alternatively be used on a section of hose of conduit 28 or 30.

An apparatus for attenuation of fluid pressure pulses in a hydraulic system of an automatic transmission in accordance with the present invention is advantageous. The use of wave tuners or stand pipes in the fluid circuit enables a relatively simple method for attenuating fluid pressure pulses. By attenuating the fluid pressure pulses, audible noise and structural vibration from the pulses is reduced. As a result, driver comfort is improved and design flexibility for the vehicle structure including the transmission oil cooler is preserved.

While the invention has been particularly shown and described with reference to the preferred embodiments thereof, it is well known by those skilled in the art that various changes and modifications can be made in the invention without departing from the spirit and scope of the invention.

We claim:

1. An apparatus for attenuation of fluid pressure pulses in a hydraulic system of an automatic transmission, comprising:

a conduit disposed between a transmission and a transmission fluid cooler, said conduit transmitting fluid between said transmission and said transmission fluid cooler; and, a first wave tuner disposed within said conduit.

2. The apparatus of claim 1 wherein said first wave tuner comprises a flexible wound metal cable.

3. The apparatus of claim 1 wherein said first wave tuner comprises a polymeric tube.

4. The apparatus of claim 1, further comprising a second wave tuner disposed within said conduit.

5. The apparatus of claim 1, further comprising a shell coupling wherein said conduit includes a hose and a tube extending into said hose, said first wave tuner is supported within said hose by said tube and said shell coupling is deformable to secure said hose on said tube.

6. The apparatus of claim 5, further comprising a coupling having a first end configured to engage said tube and a second end configured to engage said first wave tuner.

7. The apparatus of claim 6 wherein said first end of said coupling includes a plurality of deformable fingers.

8. The apparatus of claim 6 wherein said second end of said coupling defines an annular recess configured to receive said first wave tuner.

9. The apparatus of claim 6 wherein said second end of said coupling defines an end form, said first wave tuner disposed over said second end of said coupling and said end form.

10. The apparatus of claim 1, further comprising:

a restrictor disposed within said conduit; and, a shell coupling wherein said restrictor supports said first wave tuner within said hose and said shell coupling is deformable to secure said restrictor within said conduit.

11. The apparatus of claim 10, further comprising a coupling having a first end configured to engage said restrictor and a second end configured to engage said first wave tuner.

12. The apparatus of claim 10 wherein said first end of said coupling includes a plurality of deformable fingers.

13. The apparatus of claim 10 wherein said second end of said coupling defines an annular recess configured to receive said first wave tuner.

14. The apparatus of claim 10 wherein said second end of said coupling defines an end form, said first wave tuner disposed over said second end of said coupling and said end form.

15. The apparatus of claim 1, further comprising:

an insert disposed within said conduit and configured to support said first wave tuner within said conduit; and, a clamp disposed about said conduit and urging a portion of said conduit into compressive engagement with said insert.

16. An apparatus for attenuation of fluid pressure pulses in a hydraulic system of an automatic transmission, comprising:

a conduit disposed between a transmission and a transmission fluid cooler, said conduit transmitting fluid between said transmission and said transmission fluid cooler; and, a stand pipe having an open end in fluid communication with said conduit and a closed end, said stand pipe sized to attenuate said fluid pressure pulses.

17. The apparatus of claim 16 wherein said stand pipe comprises a metallic tube.

18. The apparatus of claim 16 wherein said stand pipe comprises a hose.

19. The apparatus of claim 16, further comprising a shell coupling, said stand pipe disposed about a nipple branching from said conduit and said shell coupling disposed about said hose and deformable to secure said stand pipe on said nipple.

20. The apparatus of claim 16, further comprising a valve disposed at said closed end of said stand pipe.

* * * * *